(12) United States Patent
Chiu et al.

(10) Patent No.: US 9,507,078 B2
(45) Date of Patent: Nov. 29, 2016

(54) BLACK LIGHT MODULE WITH MOUNT AND DISPLAYING APPARATUS THEREWITH

(71) Applicant: Wistron Corporation, New Taipei (TW)

(72) Inventors: Yu-Wei Chiu, New Taipei (TW); Wen-Lin Wu, New Taipei (TW)

(73) Assignee: Wistron Corporation, New Taipei (TW)

( * ) Notice: Subject to any disclaimer, the term of this patent is extended or adjusted under 35 U.S.C. 154(b) by 119 days.

(21) Appl. No.: 14/583,108

(22) Filed: Dec. 25, 2014

(65) Prior Publication Data

US 2015/0362663 A1    Dec. 17, 2015

(30) Foreign Application Priority Data

Jun. 17, 2014 (TW) .............................. 103120897 A (51) Int. Cl.
*G02F 1/1333* (2006.01)
*G02F 1/1335* (2006.01)
*F21V 8/00* (2006.01)

(52) U.S. Cl.
CPC ........... *G02B 6/0068* (2013.01); *G02B 6/0091* (2013.01); *G02B 6/0055* (2013.01)

(58) Field of Classification Search
CPC .. G02B 6/0068; G02B 6/005; G02B 6/0055; G02B 6/009; G02B 6/0085
USPC .............................................. 349/61, 62, 67
See application file for complete search history.

(56) References Cited

U.S. PATENT DOCUMENTS

| | | | |
|---|---|---|---|
| 7,883,259 B2 | 2/2011 | Hung | |
| 8,821,005 B2 * | 9/2014 | He | G02B 6/009 349/60 |
| 8,840,293 B2 * | 9/2014 | Cho | G02B 6/0068 362/606 |
| 2003/0223020 A1 * | 12/2003 | Lee | G02B 6/0088 349/58 |
| 2011/0085107 A1 * | 4/2011 | Noh | G02B 6/0085 349/61 |
| 2014/0226073 A1 * | 8/2014 | Kamada | G02F 1/133512 348/725 |

FOREIGN PATENT DOCUMENTS

TW          M432848 U1    7/2012
TW          201346390 A   11/2013

OTHER PUBLICATIONS

Office action mailed on Mar. 21, 2016 for the Taiwan application No. 103120897, filed: Jun. 17, 2014, p. 1 line 12-14, p. 2-3 and p. 4 line 1-16 Translation.

* cited by examiner

*Primary Examiner* — Hoan C Nguyen
(74) *Attorney, Agent, or Firm* — Winston Hsu; Scott Margo (57) ABSTRACT

A displaying apparatus includes a back light module and a panel module. The back light module is joined with the panel module and includes a mount, a light bar, a light guiding plate, and an optical film sheet. The mount includes a limiting structure and a holding structure. The light bar is fixed on the mount. The light guiding plate is disposed adjacent to the mount. The limiting structure constrains a stop structure so that a light incident side surface of the light guiding plate and the light bar remain separated at a predetermined interval. The optical film sheet includes a holding structure and is disposed above alight emitting surface of the light guiding plate. The two holding structures are engaged. Thereby, the mount performs limitation to both of the light guiding plate and the optical film sheet.

24 Claims, 7 Drawing Sheets

BLACK LIGHT MODULE WITH MOUNT AND DISPLAYING APPARATUS THEREWITH

BACKGROUND OF THE INVENTION

1. Field of the Invention

The disclosure relates to aback light module and a displaying apparatus, and especially relates to a back light module having a mount and using a light guiding plate to provide back light, and to a displaying apparatus with the back light module.

2. Description of the Prior Art

Common LCDs generally use a back light module with edge-lit LEDs to provide back light to a liquid crystal panel thereof. When the liquid crystal panel becomes bigger in size, the lighting units of the back light module need to operate at a higher power for maintaining the same illumination to the liquid crystal panel. Furthermore, the lighting units also need to be disposed as closer to the light guiding plate as possible, so that most light emitted by the lighting units can enter the light guiding plate. However, in principle, higher lighting power causes more generation of heat. In the back light module, with being close to the lighting units, the temperature becomes higher, so when being excessively close to or contacting the lighting units, the light guiding plate is very probably deformed or damaged due to a heat impact, leading to an uneven distribution of the back light provided by the light guiding plate. Additionally, the LCDs are usually mounted vertically. If the lighting units are disposed lower relative to the light guiding plate, the light guiding plate may move downward under its weight leading to an occurrence of the above issue of being excessively close to or contacting the lighting units.

In addition, the back light module is usually provided with an optical film sheet disposed on the light emitting surface of the light guiding plate, for modifying the property of the light out of the light emitting surface. In general, the optical film sheet is much thinner than the light guiding plate, so when the LCD is used vertically, the optical film sheet probably bends due to incapability of supporting its weight, unless sticking on the light guiding plate. This phenomenon also induces an uneven distribution of the back light provided by the light guiding plate. Moreover, the above issue will get worse with the increasing size of the liquid crystal panel.

SUMMARY OF THE INVENTION

An objective of the disclosure is to provide a back light module, which has functions of making the light incident side surface and the light bar separated at a predetermined interval and holding an optical film sheet.

The back light module of the disclosure includes a mount, a light bar, a light guiding plate, and an optical film sheet. The mount extends in an extension direction and includes a limiting structure and a first holding structure. The light bar is disposed on the mount along the extension direction. The light guiding plate is disposed adjacent to the mount and has a light incident side surface, a light emitting surface, and a stop structure. The light incident side surface extends in the extension direction and is disposed corresponding to the light bar, for example but not limited to being right opposite to the light bar, so that light emitted by the light bar is capable of entering the light guiding plate from the light incident side surface. The limiting structure constrains the stop structure so that the light incident side surface and the light bar remain separated at a predetermined interval. The optical film sheet includes a first side portion and a second holding structure. The second holding structure is located at the first side portion. The optical film sheet is disposed above the light emitting surface. The second holding structure is engaged with the first holding structure, for example but not limited to by a hook hooking a through hole. Thereby, the interval between the light guiding plate and the light bar remain can be maintained to avoid the deformation or damage to the light guiding plate due to that the light guiding plate is excessively close to or contacts the light bar. Furthermore, because of the effect of the mount holding the optical film sheet, the optical film sheet can remain flat even when the back light module is disposed vertically for use, which avoids the bending issue of the optical film sheet.

Further, the back light module may include a back plate. The mount is fixed on the back plate. The back plate includes a side wall and a third holding structure. The third holding structure is located on the side wall. The optical film sheet includes a second side portion and a fourth holding structure. The fourth holding structure is located at the second side portion. The fourth holding structure is engaged with the third holding structure. Therein, the first side portion is adjacent to or opposite to the second side portion. Thereby, the optical film sheet can be supported more firmly, so that the optical film sheet can remain flat even when the back light module is vertically used in different directions.

Another objective of the disclosure is to provide a displaying apparatus, which uses the back light module of the disclosure so that when the displaying apparatus is vertically used, the interval between the light incident side surface and the light bar can be maintained and the optical film sheet remains flat.

The displaying apparatus of the disclosure includes a back light module and a panel module. The panel module is joined with the back light module. The back light module includes a mount, a light bar, a light guiding plate, and an optical film sheet. The mount extends in an extension direction and has a C-shaped profile perpendicular to the extension direction. The mount includes a limiting structure and a first holding structure. The light bar is disposed on the mount along the extension direction. The light guiding plate is disposed adjacent to the mount and has a light incident side surface, a light emitting surface, and a stop structure. The light incident side surface extends in the extension direction and is right opposite to the light bar. The limiting structure constrains the stop structure so that the light incident side surface and the light bar remain separated at a predetermined interval. The optical film sheet includes a first side portion and a second holding structure. The second holding structure is located at the first side portion. The optical film sheet is disposed above the light emitting surface. The second holding structure is engaged with the first holding structure, for example but not limited to by a hook hooking a through hole. The panel module includes a panel disposed above the optical film sheet. Similarly, the interval between the light guiding plate and the light bar remain can be maintained. Furthermore, when the displaying apparatus is disposed vertically for use, the optical film sheet can remain flat so that the back light provided by the back light module to the panel module is uniform so that the displaying apparatus can display correct images.

Further, the panel module may include an inner frame and an outer frame. The inner frame and the outer frame fix the panel. The back light module may include a back plate. The mount is fixed on the back plate. The back plate includes a side wall and a third holding structure. The third holding structure is located on the side wall. The optical film sheet includes a second side portion and a fourth holding structure. The fourth holding structure is located at the second side portion. The fourth holding structure is engaged with the third holding structure. The inner frame is joined with the back plate and located between the back plate and the outer frame. Therein, the first side portion is adjacent to or opposite to the second side portion. Thereby, the optical film sheet can be supported more firmly, so that even when the back light module is vertically used in different directions, the optical film sheet can remain flat and the displaying apparatus can display correct images.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
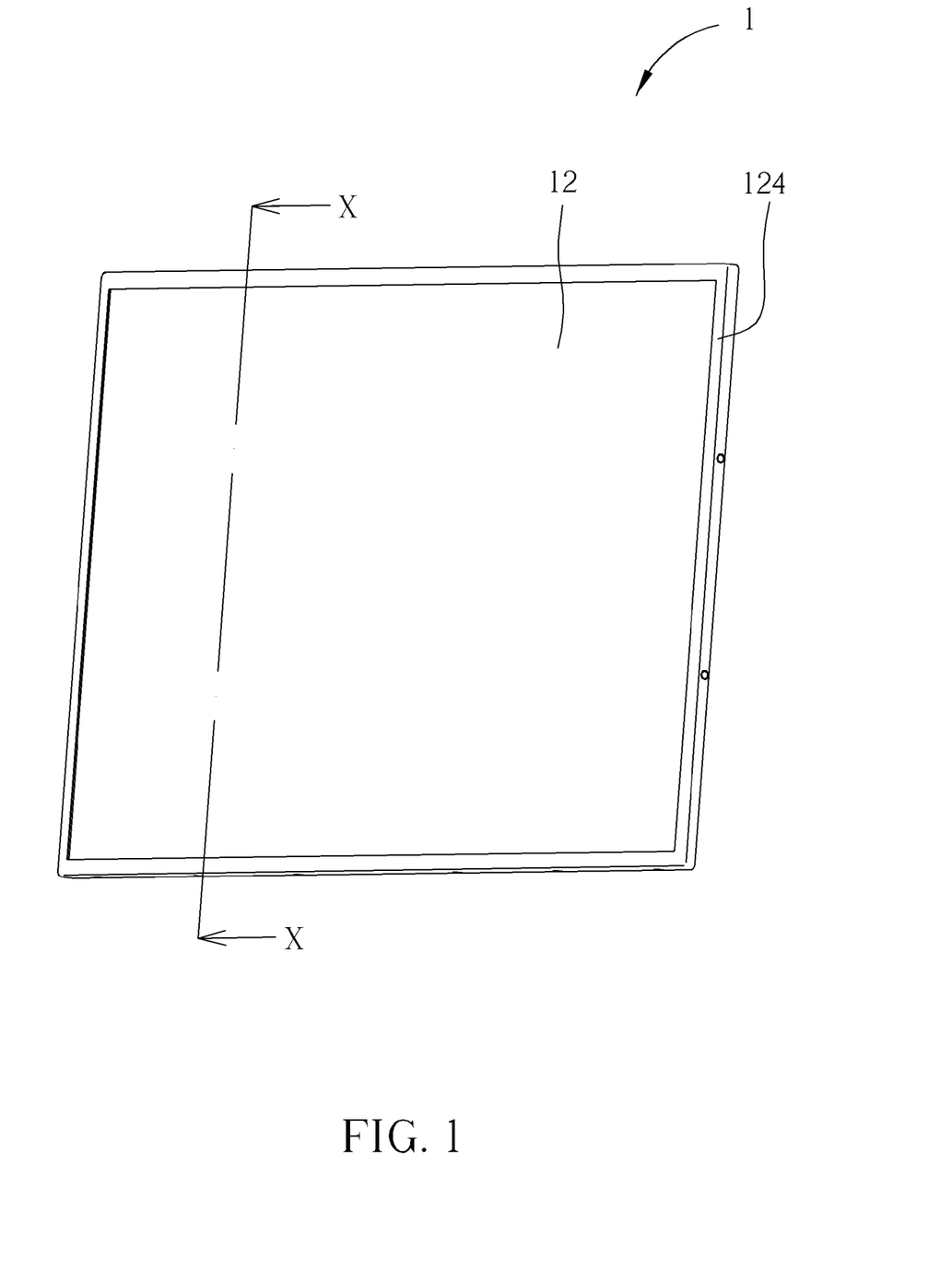
FIG. 1 is a schematic diagram illustrating a displaying apparatus of an embodiment according to the disclosure.
Figure 2:
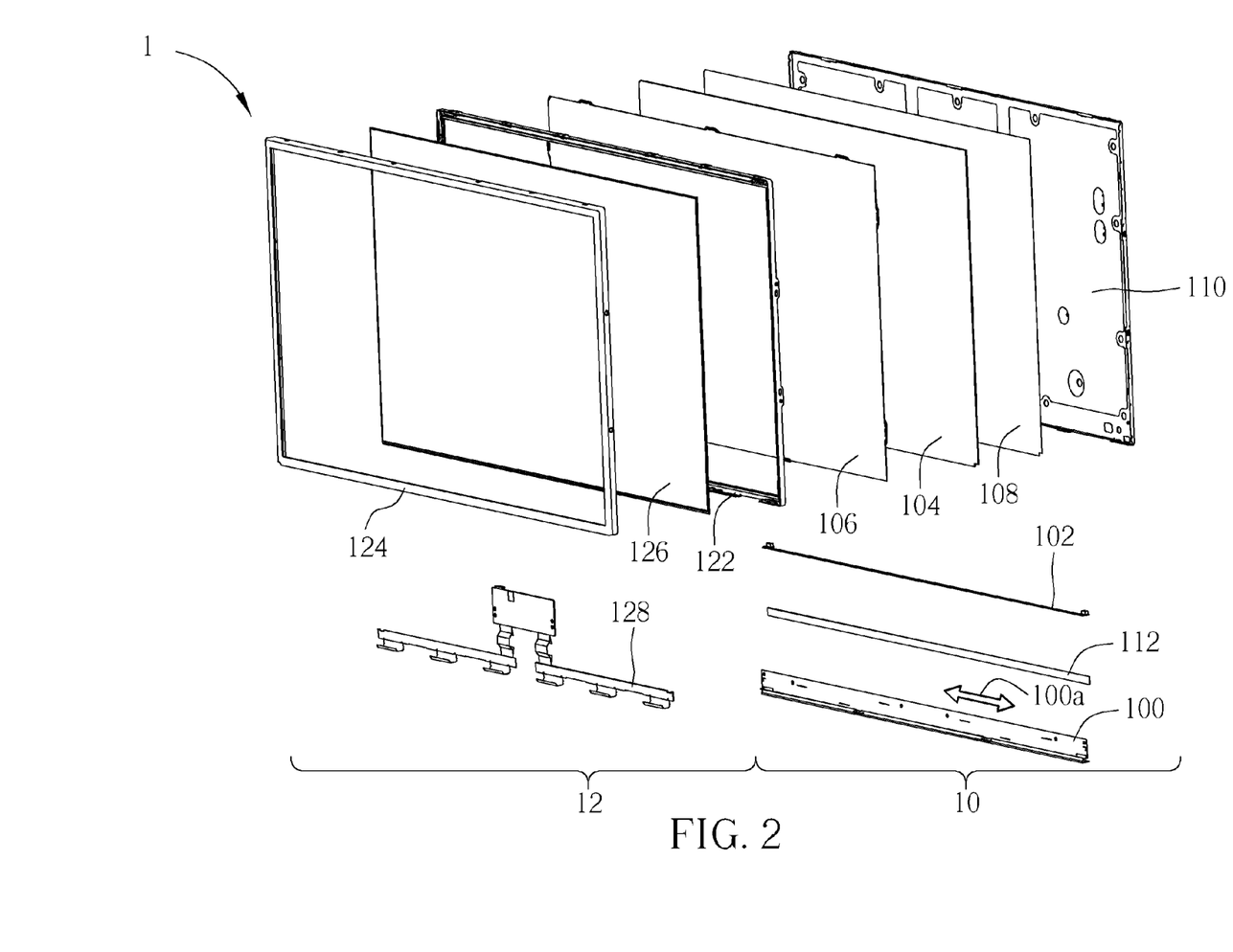
FIG. 2 is an exploded view of the displaying apparatus in FIG. 1.
Figure 3:
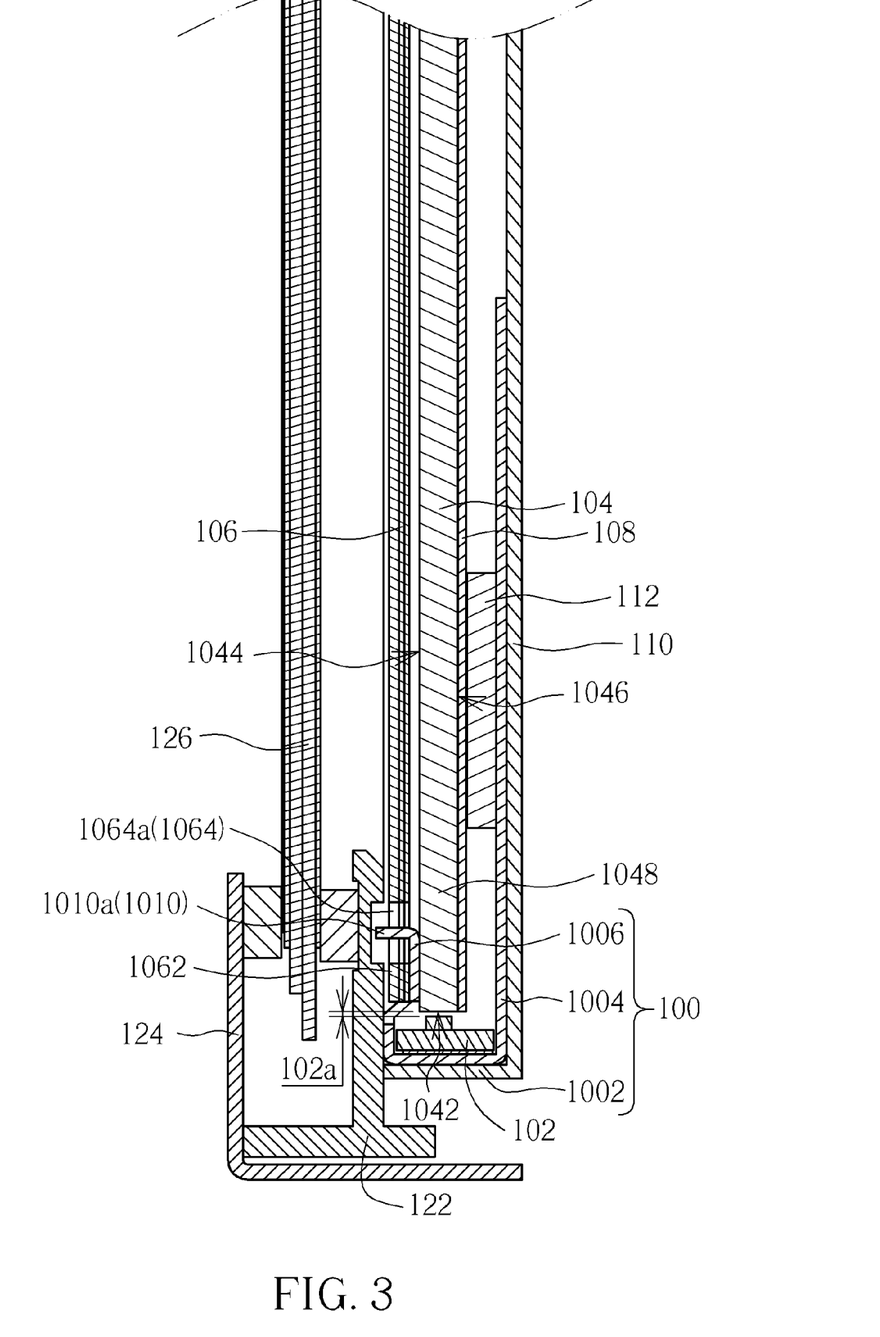
FIG. 3 is a sectional view of a portion of the displaying apparatus along the line X-X in FIG. 1.

Please refer to FIGS. 1 to 3. FIG. 1 is a schematic diagram illustrating a displaying apparatus 1 of an embodiment according to the disclosure. FIG. 2 is an exploded view of the displaying apparatus 1. FIG. 3 is a sectional view of a portion of the displaying apparatus 1 along the line X-X in FIG. 1.

The displaying apparatus 1 includes a back light module 10 and a panel module 12. The back light module 10 is joined with the panel module 12. The back light module 10 provides back light to the panel module 12. The back light module 10 includes a mount 100, a light bar 102, a light guiding plate 104, an optical film sheet 106, a reflection sheet 108, and a back plate 110. The mount 100 extends in an extension direction 100a and is fixed on the back plate 110. The light bar 102 is disposed on the mount 100 along the extension direction 100a, for example but not limited to being mounted on the mount 100 with heat conductive glue. The light guiding plate 104 is disposed adjacent to the mount 100. The light guiding plate 104 has a light incident side surface 1042 and a light emitting surface 1044. The light incident side surface 1042 extends in the extension direction 100a corresponding to the light bar 102, so that light emitted by the light bar 102 is capable of entering the light guiding plate 104 from the light incident side surface 1042. In the embodiment, the light incident side surface 1042 is right opposite to (the light emitting surface of) the light bar 102. The optical film sheet 106 is disposed above the light emitting surface 1044 for light modulation, e.g. light diffusion, brightness enhancement and so on. The reflection sheet 108 is disposed on a surface 1046 of a side of the light guiding plate 104 opposite to the optical film sheet 106 and used for reflecting the light in the light guiding plate 104 toward the reflection sheet 108. The panel module 12 includes an inner frame 122, an outer frame 124, a panel 126, and a control circuit 128. The inner frame 122 and the outer frame 124 fix the panel 126 together. The panel 126 is disposed above the optical film sheet 106. The control circuit 128 is electrically connected with the panel 126 and controls the operation of the panel 126. The light in the light guiding plate 104 can travel out of the light guiding plate 104 through the light emitting surface 1044 and pass through the optical film sheet 106 to provide needed back light to the panel 126. In practice, the panel 126 can be but not limited to a liquid crystal panel. The control circuit 128 controls the panel 126 to permit or forbid the back light to pass through, so that the displaying apparatus 1 can display images. Therein, the mount 100 can be heat conductive, for example made of metal-based material, so that heat produced by the light bar 102 in operation can be dissipated through the mount 100. In the embodiment, the back plate 110 is also heat conductive, for example made of metal-based material and tightly contacting the mount 100 by screws, so that the heat transferred to the mount 100 can be further transferred to the back plate 110 to dissipate the heat through a larger area.

Figure 4:
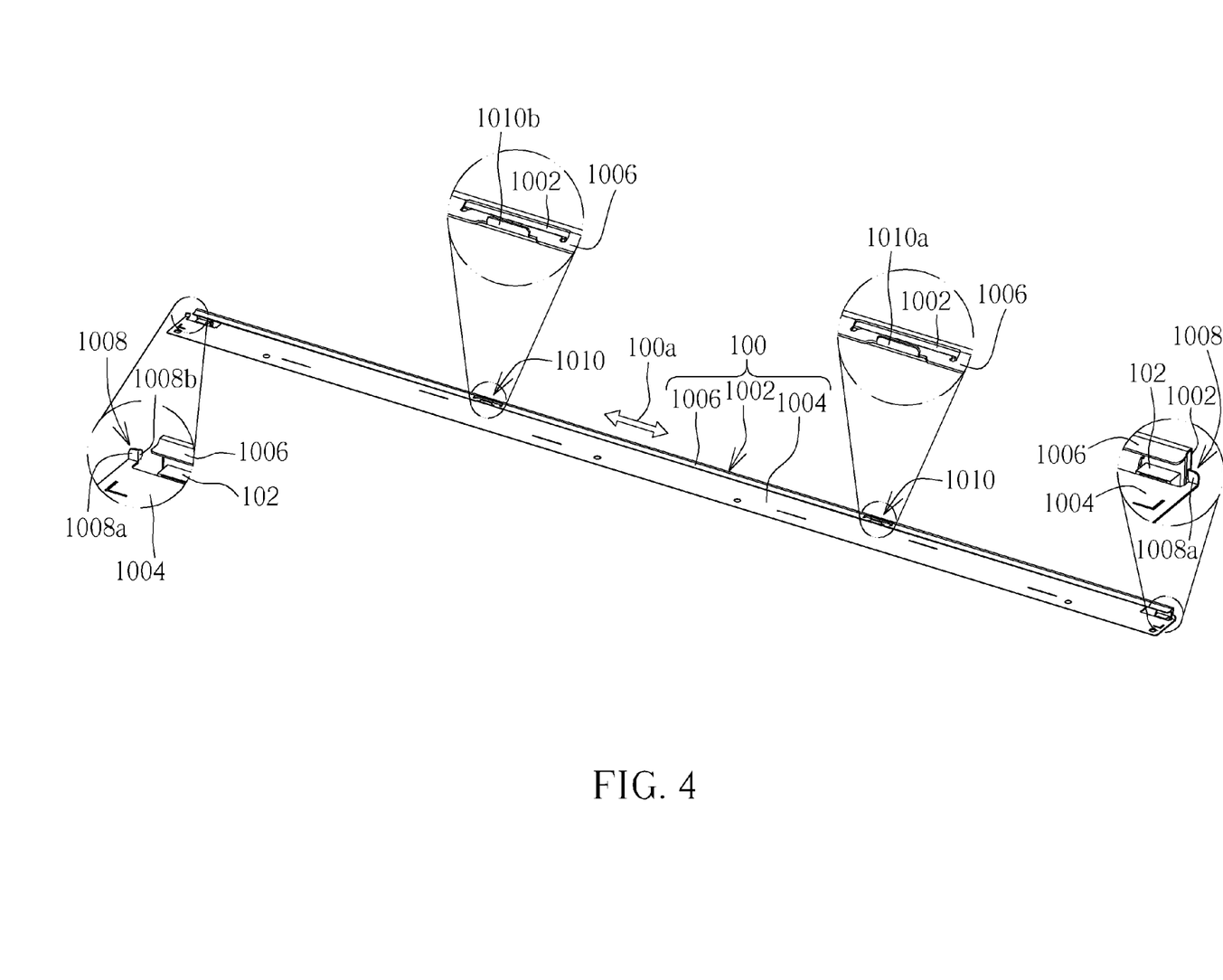
FIG. 4 is a schematic diagram illustrating a mount and a light bar of a back light module of the displaying apparatus in FIG. 1.
Figure 5:
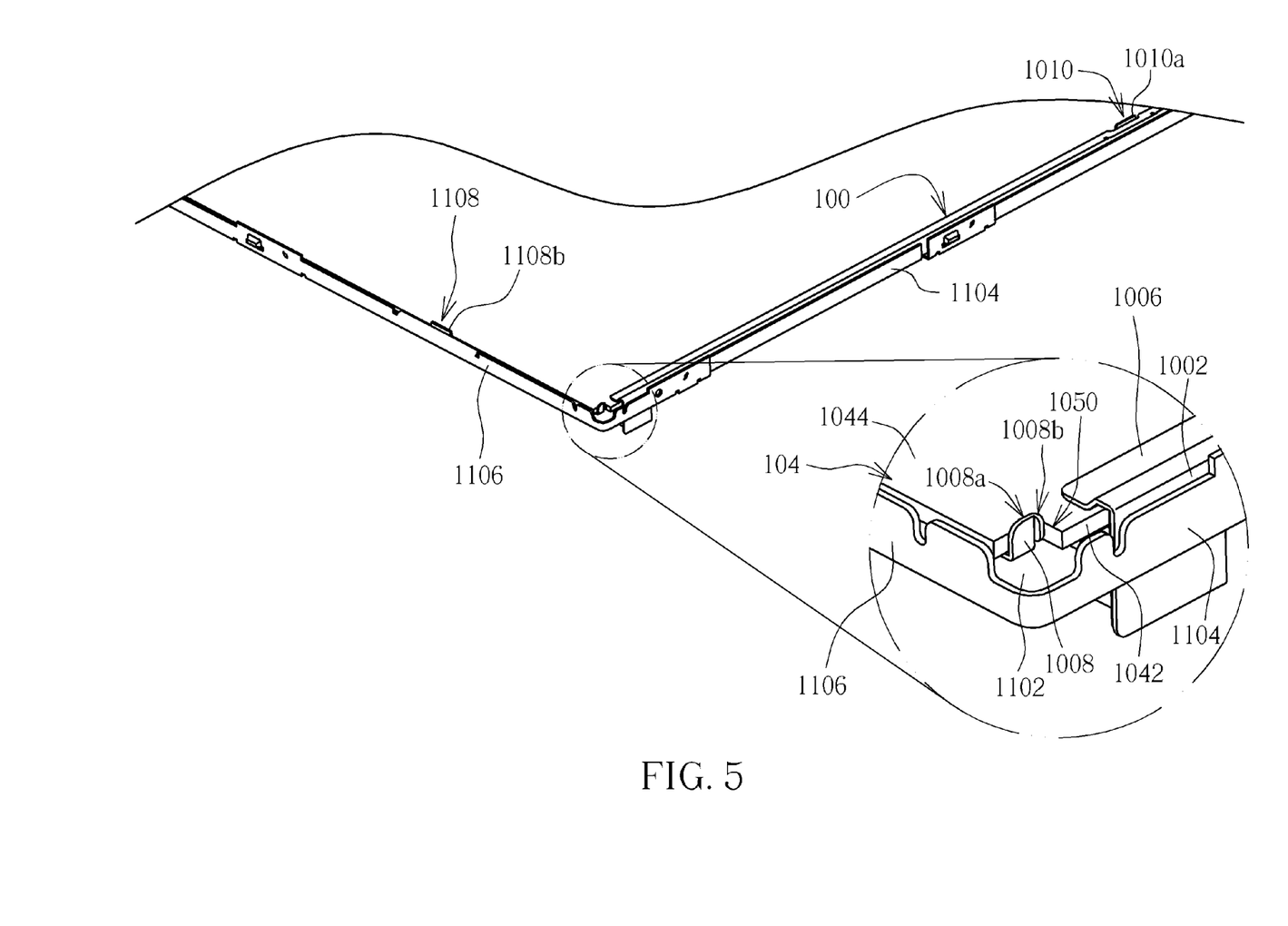
FIG. 5 is an enlarged view of a portion of the assembly of a light guiding plate and the mount of the back light module of the displaying apparatus in FIG. 1.
Figure 6:
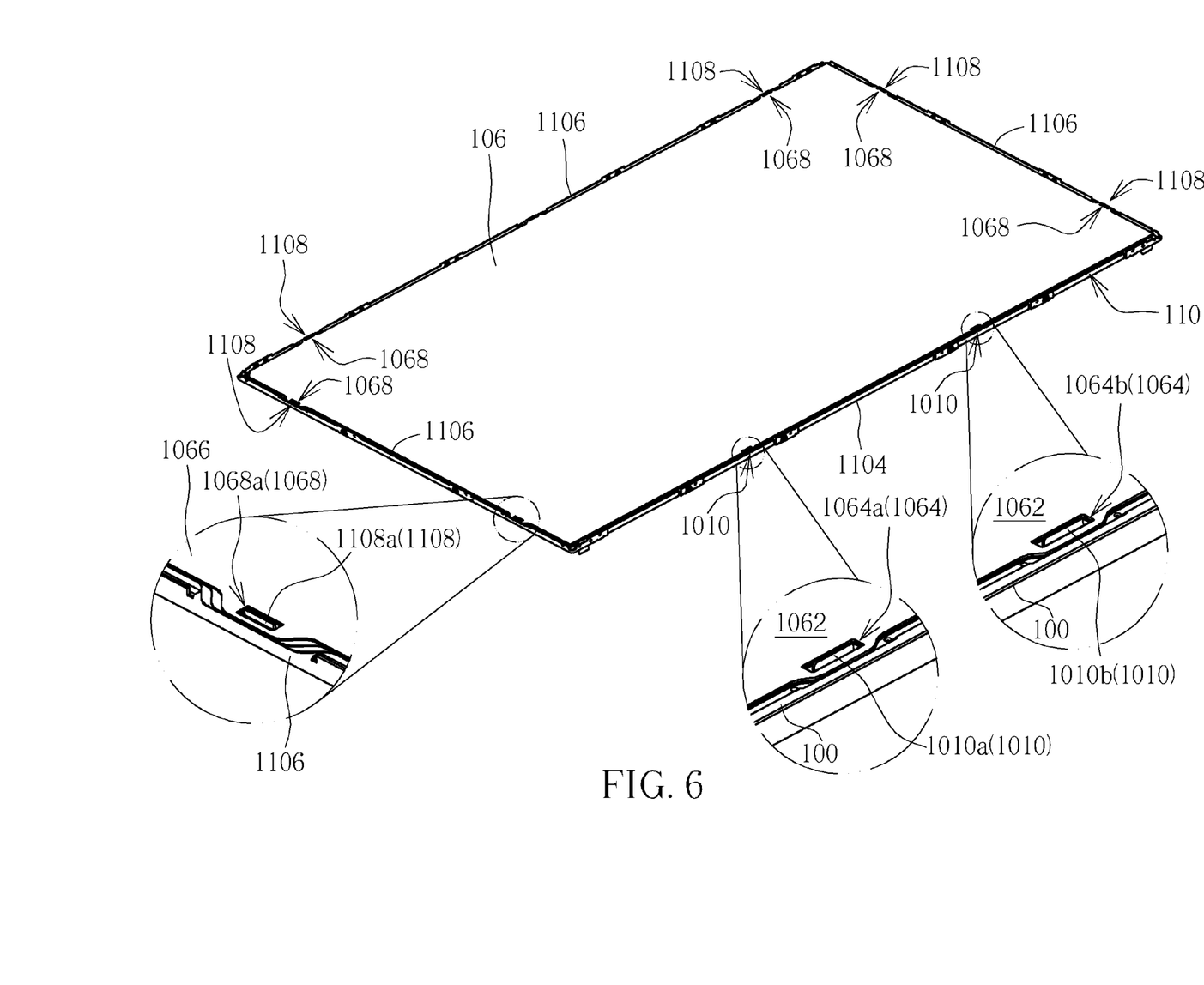
FIG. 6 is a schematic diagram illustrating the back light module of the displaying apparatus in FIG. 1.

Please also refer to FIGS. 4 to 6. FIG. 4 is a schematic diagram illustrating the mount 100 and the light bar 102 disposed thereon and includes a few enlarged portions thereof. FIG. 5 is an enlarged view of a portion of the light guiding plate 104 and the mount 100 assembled thereon and includes an enlarged portion thereof. FIG. 6 is a schematic diagram illustrating the back light module 10 and includes a few enlarged portions thereof. The mount 100 has a C-shaped profile perpendicular to the extension direction 100a. The mount 100 includes a main portion 1002, a dissipation portion 1004, a clamping portion 1006, two limiting structures 1008, and a first holding structure 1010. The dissipation portion 1004 and the clamping portion 1006 are connected with two sides of the main portion 1002 oppositely relative to the extension direction 100a. Each of the main portion 1002, the dissipation portion 1004, and the clamping portion 1006 extends in the extension direction 100a, so that the mount 100 as a whole shows a structure of a C-shaped clamp. Therefore, the cross section of the main portion 1002, the dissipation portion 1004, and the clamping portion 1006 perpendicular to the extension direction 100a is C-shaped. The two limiting structures 1008 are located at two ends of the mount 100 in the extension direction 100a. In the embodiment, the mount 100 is a stamped part of sheet metal. The mount 100 can be made in one piece or by joining two stamped parts of sheet metal, each of which extends in the extension direction 100a. The limiting structure 1008 is disposed on the dissipation portion 1004, i.e. extending and bending from the dissipation portion 1004; however, the disclosure is not limited thereto. For example, the limiting structure 1008 can be formed by bending a portion extending from the main portion 1002 or the clamping portion 1006. The first holding structure 1010 is disposed on the clamping portion 1006. In the embodiment, the first holding structure 1010 is formed by bending a portion extending from the clamping portion 1006.

The light bar 102 is fixed on the main portion 1002. The heat produced by the light bar 102 in operation can be transferred through the main portion 1002 to the dissipation portion 1004 and the back plate 110 to dissipate the heat. A side edge portion 1048 of the light guiding plate 104 includes the light incident side surface 1042 and is located between the dissipation portion 1004 and the clamping portion 1006. The light emitting surface 1044 is toward the clamping portion 1006. The reflection sheet 108 is disposed between the dissipation portion 1004 and the surface 1046 of the light guiding plate 104 opposite to the optical film sheet 106. In the embodiment, the back light module 10 further includes a spacer 112, for example made of heat insulation material, disposed between the reflection sheet 108 and the dissipation portion 1004 so that the spacer 112 can separate the reflection sheet 108 the dissipation portion 1004. This configuration can reduce or avoid an influence of the heat transferred to the dissipation portion 1004 on the reflection sheet 108. In practice, if the above influence can be ignored, the above spacer 112 also can be omitted; in this case, the reflection sheet 108 can be laid substantially flat on the dissipation portion 1004. In practice, the distance between the dissipation portion 1004 and the clamping portion 1006 can be designed such that the light guiding plate 104 can be held under a holding force between the dissipation portion 1004 and the clamping portion 1006, which enhances the stability of the relative position between the light guiding plate 104 and the light bar 102.

Furthermore, the light guiding plate 104 includes two stop structures 1050 corresponding to the two limiting structures 1008 respectively. The limiting structures 1008 constrain the stop structures 1050 so that the light incident side surface 1042 and the light bar 102 remain separated at a predetermined interval 102*a* (equivalent to the size of the gap between the light incident side surface 1042 and the light bar 102 in the view of FIG. 3). In practice, it is improper for the predetermined interval 102*a* to be so large that it is difficult to improve the ratio of the light, entering the light guiding plate 104 through the light incident side surface 1042, to the light, emitted by the light bar 102, leading to waste of energy. In another aspect, it is also improper for the predetermined interval 102*a* to be so small that the heat produced by the light bar 102 in operation directly affects the side edge portion 1048 of the light guiding plate 104 (for example by heat radiation or heat convection). In the embodiment, the stop structures 1050 are close to or contact the limiting structures 1008. In a practical application, when the displaying apparatus 1 is for a vertical use (i.e. vertically disposed for use) and the mount 100 is located below the light guiding plate 104, the limiting structures 1008 can abut against the stop structures 1050 so that the light guiding plate 104 is blocked from further approaching the light bar 102; that is, the predetermined interval 102*a* is maintained. It is added that, in the embodiment, the displaying apparatus 1 has the light bar 102 only at one side of the light guiding plate 104, so the light guiding plate 104 can be constrained through other sides thereof by other structural parts or limiting structures; however, the disclosure is not limited thereto. For example, the light bar 102 and the mount 100 are disposed at each of the opposite sides of the light guiding plate 104.

In addition, in the embodiment, the stop structure 1050 includes an indentation (i.e. a notch structure at a corner of the light guiding plate 104) located at a circumference (e.g. including the side edge portion 1048 of the light incident side surface 1042) of the light guiding plate 104. The limiting structure 1008 can fit in the indentation for the purpose of constraining the stop structure 1050. Correspondingly, the limiting structure 1008 has a first limitation surface 1008*a* and a second limitation surface 1008*b*, which abut against two side walls of the indentation for the purpose of constraining the stop structure 1050 so that movements of the light guiding plate 104 in a direction perpendicular to the extension direction 100*a* and parallel to light guiding plate 104, and in the extension direction 100*a* are limited. Therein, the first limitation surface 1008*a* and the second limitation surface 1008*b* can abut against the two side walls of the indentation through a large contact area (not just the plate thickness), which avoids damage to the light guiding plate 104 due to a too high contact stress between the limiting structure 1008 and the stop structure 1050. In addition, in practice, it is practicable to take a portion of the light incident side surface 1042 as the stop structure 1050, which can reduce or avoid the influence of the stop structure 1050 on the light distribution inside the light guiding plate 104 (e.g. a relatively high intensity of the light emitted from where a bigger indentation or notch structure is formed may be induced).

Furthermore, the optical film sheet 106 includes a first side portion 1062 and a second holding structure 1064 located at the first side portion 1062. The optical film sheet 106 covers the light emitting surface 1044 of the light guiding plate 104. The first side portion 1062 is disposed on the clamping portion 1006 relative to the side edge portion 1048 of the light guiding plate 104. The second holding structure 1064 is engaged with the first holding structure 1010. In a practical application, when the displaying apparatus 1 is for a vertical use (i.e. vertically disposed for use) and the mount 100 is located above the light guiding plate 104, the mount 100 supports the optical film sheet 106 by the engagement of the second holding structure 1064 with the first holding structure 1010 so that the optical film sheet 106 can be laid flat and a bending appearance of the optical film sheet 106 due to its weight can be avoided. In the embodiment, the first holding structure 1010 includes two hooks 1010*a* and 1010*b*. The second holding structure 1064 includes two through hole 1064*a* and 1064*b* correspondingly. The engagement of the second holding structure 1064 with the first holding structure 1010 is achieved by the hooks 1010*a* and 1010*b* hooking the corresponding through holes 1064*a* and 1064*b*, which also achieves the purpose of the mount 100 holding the optical film sheet 106. In practice, the engagement of the second holding structure 1064 with the first holding structure 1010 can be realized by other mechanisms. It is added that, in the embodiment, the optical film sheet 106 is formed by layering a plurality of optical films the through holes 1064*a* and 1064*b* passing through; however, the disclosure is not limited thereto. For example, based on the size differences between the optical films, the through holes 1064*a* and 1064*b* can be formed only on one of the optical films, which still meets the requirement for passing through the optical film sheet 106 as a whole and matching with the hooks 1010*a* and 1010*b*. Furthermore, the optical film sheet 106 is not limited to include a multilayer optical film.

In addition, the back plate 110 includes a bottom 1102 and a surrounding wall portion. The surrounding wall portion includes a first side wall 1104 and three second side walls 1106, extending and bending from the bottom 1102 and substantially surrounding the bottom 1102 so that an accommodating space is formed therebetween for accommodating the back light module 10. Therein, the mount 100 is disposed substantially adjacent to the first side wall 1104 in the accommodating space. In the embodiment, the surrounding portion also supports or holds the optical film sheet 106. The back plate 110 further includes three third holding structures 1108 disposed on the three second side walls 1106 respectively. The optical film sheet 106 includes three second side portions 1066 and three fourth holding structures 1068 correspondingly. The three fourth holding structures 1068 are disposed on the three second side portions 1066 respectively. Therein, the three second side portion 1066 includes some adjacent to the first side portion 1062 and one opposite to the first side portion 1062. The fourth holding structure 1068s are engaged with the third holding structure 1108 respectively, leading to the achievement of the back plate 110 holding the optical film sheet 106. Thereby, whatever rotation angle the displaying apparatus 1 is disposed for a vertical use (or vertically disposed), for example disposed at 90, 180 or 270 degrees relative to a viewpoint of a user, by the effect of the mount 100 and the back plate 110 holding the optical film sheet 106, the optical film sheet 106 can be laid flat and a bending appearance of the optical film sheet 106 due to its weight can be avoided. In the embodiment, like the first holding structure 1010, the third holding structure 1108 includes two hooks 1108a; like the second holding structure 1064, the fourth holding structure 1068 includes two through holes 1068a correspondingly. However, the disclosure is not limited thereto. For other descriptions of the third holding structure 1108 and the fourth holding structure 1068, please refer to the related descriptions of the first holding structure 1010 and the second holding structure 1064.

Figure 7:
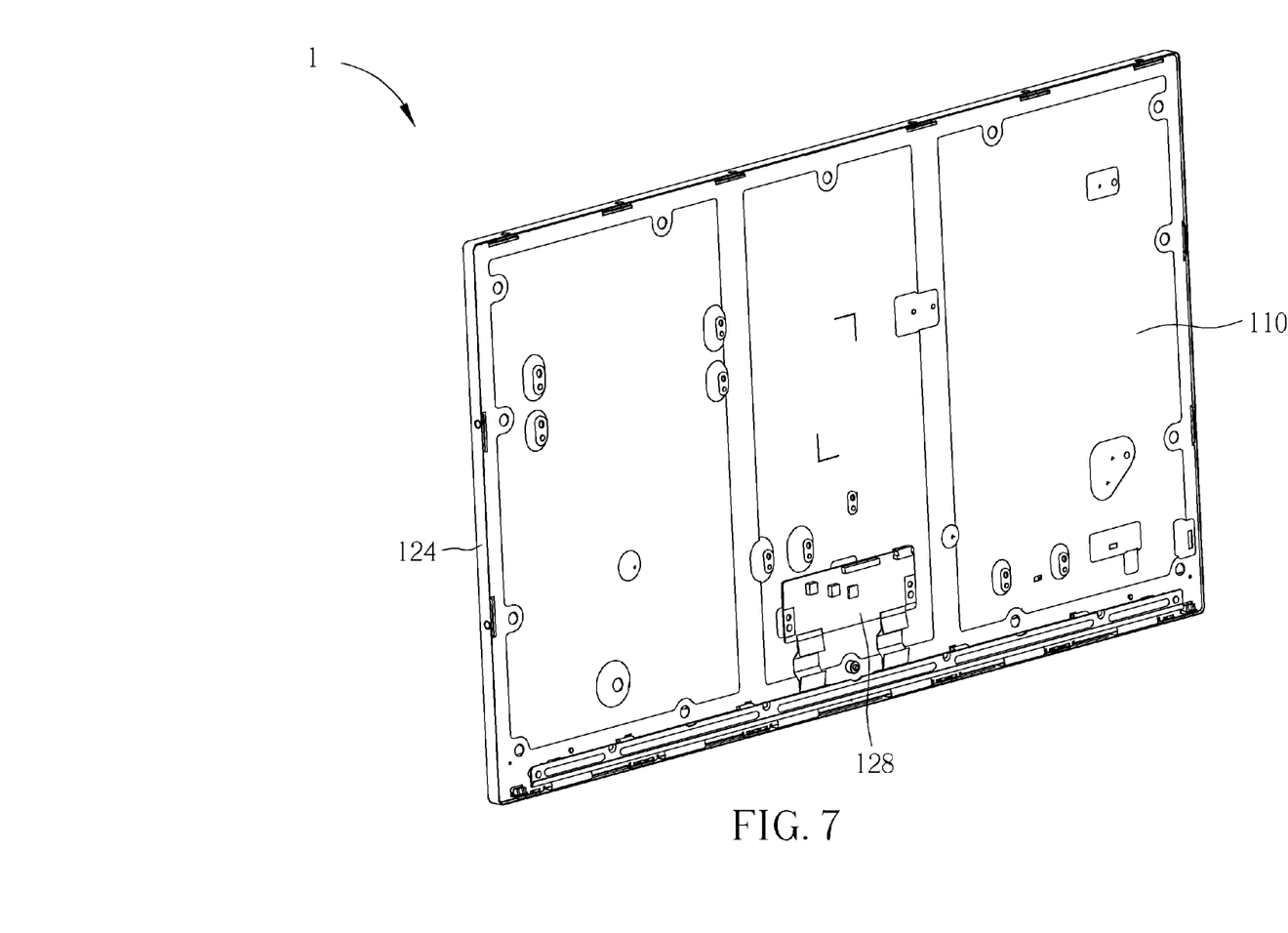
FIG. 7 is a schematic diagram illustrating the displaying apparatus in FIG. 1 in another view point.

It is added that, in the embodiment, the combination of the back light module 10 and the panel module 12 is achieved by joining the inner frame 122 and the surrounding portion of the back plate 110. Therein, the inner frame 122 is located between the back plate 110 and the outer frame 124 and above the clamping portion 1006. After the back light module 10 is joined with the panel module 12, the outer frame 124 covers the inner frame 122 substantially; that is, the inner frame 122 is invisible from the outside of the displaying apparatus 1. Furthermore, by a control over the interval between the inner frame 122 and the clamping portion 1006, it can be avoided that the first holding structure 1010 is disengaged from the second holding structure 1064, and further, the inner frame 122 can press on the optical film sheet 106 leading to an improvement in the holding of the mount 100 to the optical film sheet 106. The circuit board of the control circuit 128 is disposed on a side of the back plate 110 opposite to the light guiding plate 104; the connection cable of the control circuit 128 passes between the inner frame 122 and the outer frame 124 and is electrically connected with the panel 126, as shown by FIG. 7. In practice, the displaying apparatus 1 can further include a back cover (not shown in the figures) joined with the outer frame 124 or the back plate 110 and covers the back plate 110 for a better apparatus appearance.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A back light module, comprising:
   a mount extending in an extension direction and comprising a limiting structure and a first holding structure;
   a back plate comprising a third holding structure, the third holding structure comprising a hook, the mount being fixed on the back plate;
   a light bar disposed on the mount along the extension direction;
   a light guiding plate adjacent to the mount, the light guiding plate having a light incident side surface, a light emitting surface, and a stop structure, the light incident side surface extending in the extension direction and being disposed corresponding to the light bar so that light emitted by the light bar is capable of entering the light guiding plate from the light incident side surface, the limiting structure constraining the stop structure so that the light incident side surface and the light bar remain separated at a predetermined interval; and
   an optical film sheet comprising a first side portion, a second side portion, a second holding structure, and a fourth holding structure, the first side portion being adjacent to or opposite to the second side portion, the second holding structure being located at the first side portion, the optical film sheet being disposed above the light emitting surface, the second holding structure being engaged with the first holding structure so that when the back light module is disposed vertically for use, the optical film sheet remains flat, the fourth holding structure comprising a through hole, the hook of the third holding structure hooking the through hole of the fourth holding structure.

2. The back light module of claim 1, wherein the mount comprises a main portion, a dissipation portion, and a clamping portion, the dissipation portion and the clamping portion are connected with two sides of the main portion oppositely relative to the extension direction, the light bar is fixed on the main portion, the light guiding plate is held between the dissipation portion and the clamping portion, the light emitting surface is toward the clamping portion, and the first holding structure is disposed on the clamping portion.

3. The back light module of claim 2, wherein the first side portion is disposed on the clamping portion opposite to the light guiding plate.

4. The back light module of claim 2, further comprising a reflection sheet disposed between the light guiding plate and the dissipation portion.

5. The back light module of claim 4, further comprising a spacer, disposed between the reflection sheet and the dissipation portion and separating the reflection sheet and the dissipation portion.

6. The back light module of claim 2, wherein the limiting structure is disposed on the dissipation portion.

7. The back light module of claim 1, wherein the first holding structure comprises a hook, the second holding structure comprises a through hole, and the hook of the first holding structure hooks the through hole of the second holding structure.

8. The back light module of claim 1, wherein the limiting structure is located at an end of the mount in the extension direction.

9. The back light module of claim 1, wherein the limiting structure constrains the stop structure so that a movement of the light guiding plate in the extension direction is limited.

10. The back light module of claim 9, wherein the stop structure comprises an indentation located at a circumference of the light guiding plate, and the limiting structure fits in the indentation.

11. The back light module of claim 1, wherein the back plate comprises a side wall, the third holding structure is located on the side wall, and the fourth holding structure is located at the second side portion.

12. The back light module of claim 1, wherein the mount has a C-shaped profile perpendicular to the extension direction.

13. The back light module of claim 1, wherein the light incident side surface is right opposite to the light bar.

14. A displaying apparatus, comprising:
  a back light module, comprising:
    a mount extending in an extension direction and having a C-shaped profile perpendicular to the extension direction, the mount comprising a limiting structure and a first holding structure;
    a back plate comprising a third holding structure, the third holding structure comprising a hook, the mount being fixed on the back plate;
    a light bar disposed on the mount along the extension direction;
    a light guiding plate adjacent to the mount, the light guiding plate having a light incident side surface, a light emitting surface, and a stop structure, the light incident side surface extending in the extension direction and being right opposite to the light bar, the limiting structure constraining the stop structure so that the light incident side surface and the light bar remain separated at a predetermined interval; and
    an optical film sheet comprising a first side portion, a second side portion, a second holding structure, and a fourth holding structure, the first side portion being adjacent to or opposite to the second side portion, the second holding structure being located at the first side portion, the optical film sheet being disposed above the light emitting surface, the second holding structure being engaged with the first holding structure, the fourth holding structure comprising a through hole, the hook of the third holding structure hooking the through hole of the fourth holding structure; and
  a panel module joined with the back light module, the panel module comprising:
    a panel disposed above the optical film sheet.

15. The displaying apparatus of claim 14, wherein the mount comprises a main portion, a dissipation portion, and a clamping portion, the dissipation portion and the clamping portion are connected with two sides of the main portion oppositely relative to the extension direction, the light bar is fixed on the main portion, the light guiding plate is held between the dissipation portion and the clamping portion, the light emitting surface is toward the clamping portion, and the first holding structure is disposed on the clamping portion.

16. The displaying apparatus of claim 15, wherein the first side portion is disposed on the clamping portion opposite to the light guiding plate.

17. The displaying apparatus of claim 15, wherein the back light module comprises a reflection sheet disposed between the light guiding plate and the dissipation portion.

18. The displaying apparatus of claim 17, wherein the back light module comprises a spacer, disposed between the reflection sheet and the dissipation portion and separating the reflection sheet and the dissipation portion.

19. The displaying apparatus of claim 15, wherein the limiting structure is disposed on the dissipation portion.

20. The displaying apparatus of claim 14, wherein the first holding structure comprises a hook, the second holding structure comprises a through hole, and the hook of the first holding structure hooks the through hole of the second holding structure.

21. The displaying apparatus of claim 14, wherein the limiting structure is located at an end of the mount in the extension direction.

22. The displaying apparatus of claim 14, wherein the limiting structure constrains the stop structure so that a movement of the light guiding plate in the extension direction is limited.

23. The displaying apparatus of claim 22, wherein the stop structure comprises an indentation located at a circumference of the light guiding plate, and the limiting structure fits in the indentation.

24. The displaying apparatus of claim 14, wherein the panel module comprises an inner frame and an outer frame, the inner frame and the outer frame fix the panel, the back plate comprises a side wall, the third holding structure is located on the side wall, the fourth holding structure is located at the second side portion, and the inner frame is joined with the back plate and located between the back plate and the outer frame.

* * * * *